United States Patent [19]
Reits

[11] Patent Number: 6,091,360
[45] Date of Patent: Jul. 18, 2000

[54] ANTENNA SYSTEM

[75] Inventor: Bernard Jozef Reits, Hengelo, Netherlands

[73] Assignee: Hollandse Signaalapparaten B.V., Hengelo, Netherlands

[21] Appl. No.: 09/119,620

[22] Filed: Jul. 21, 1998

[30] Foreign Application Priority Data

Aug. 20, 1997 [NL] Netherlands ............................ 1006812

[51] Int. Cl.$^7$ ................................ H01Q 3/22; H04B 1/10
[52] U.S. Cl. ............................ 342/368; 342/198; 455/295
[58] Field of Search ..................... 455/78, 295; 342/368, 342/373, 378, 383, 198, 59

[56] References Cited

U.S. PATENT DOCUMENTS

| | | |
|---|---|---|
| 3,256,520 | 6/1966 | Blitz .......................................... 342/128 |
| 4,124,852 | 11/1978 | Steudel . |
| 4,212,012 | 7/1980 | Manoogian et al. . |
| 4,952,193 | 8/1990 | Talwar . |
| 4,991,165 | 2/1991 | Cronyn . |
| 5,444,864 | 8/1995 | Smith . |

FOREIGN PATENT DOCUMENTS 2 270 444   3/1997   United Kingdom .

*Primary Examiner*—Mark Hellner
*Attorney, Agent, or Firm*—Oblon, Spivak, McClelland, Maier & Neustadt, P.C.

[57] ABSTRACT

The invention relates to a multi-face phased array antenna. To prevent crosstalk between the individual faces, each face comprises two cancellers, each of which cancels the crosstalk from an adjacent face. To this end, each canceller receives a reference signal from an adjacent face and is provided with a quadrature mixer and a vector modulator.

3 Claims, 4 Drawing Sheets

ANTENNA SYSTEM

BACKGROUND OF THE INVENTION

The invention relates to a phased array antenna system, comprising at least two phased array antenna faces, both provided with an array of radiating elements, an array of T/R modules connected to the array of radiating elements, a summing network for summing output signals of the array of T/R modules and a control unit for generating control signals for the individual antenna faces.

Antenna systems of this type are well-known in the art and are for instance used on board naval ships for a substantial number of tasks which, until recently, required the availability of several separate fire-control and surveillance radar systems.

With multi-face phased array antenna systems it is preferably assumed that the various antenna faces are capable of operating independently. In this respect, a more specific assumption is that transmission by one antenna face and reception by another antenna face may coincide, or worded differently, that the insulation between the various faces is satisfactory. Broadly speaking, this is true: it is possible to design the antenna faces such that the side lobe level is kept to a minimum, thus providing a sufficient insulation for any combination of beam directions.

The installation of the phased array antenna system on board a ship may alter the situation. If a large object, a ferry-boat for instance, is irradiated by two different antenna faces simultaneously, which is possible because beams generated by two adjacent antenna faces will usually overlap to a slight extent, the infeasibility of coincident transmission and reception can be readily ascertained. This problem may also occur for less powerful reflectors. Initially, this problem can be easily solved by scheduling the transmissions for adjacent antenna faces in such a manner that the beams are not parallel or not substantially parallel and by stipulating, in case of transmissions for adjacent antenna faces, a predetermined frequency difference. Notwithstanding these measures, the antenna face side lobes in combination with a powerful reflector in the vicinity of the antenna system are still found to cause crosstalk from one antenna face to another.

SUMMARY OF THE INVENTION

The present invention is aimed at minimising the above-described potential problem in that crosstalk signals from a transmitting antenna face to a receiving antenna face are actively suppressed and is characterised in that each antenna face incorporates at least one canceller for at least substantially cancelling crosstalk signals produced by the at least one remaining antenna face.

An advantageous embodiment of the invention is based on the assumption that the crosstalk signals are usually so weak that they appear at the output of the summing network practically undistorted. This embodiment is characterised in that per antenna face a summator is provided for summing an output signal of the at least one canceller incorporated in each antenna face and a summing network output signal. A first canceller input is then preferably connected to the control unit to enable the reception of the control signals so as to obtain an exact and noise-free replica of the crosstalk signals.

In another advantageous embodiment, a second canceller input is connected to the summing network output signal and a canceller signal is subsequently generated in feedforward mode. This has the advantage that the correlator settling time is very short, which prevents the canceller signal from introducing additional noise into the system. A potential drawback of this embodiment is that minor errors in the canceller such as gain, phase and offset errors may limit the cancellation ratio, certainly if the antenna system is designed to cover a large bandwidth.

In yet another advantageous embodiment, a second canceller input is connected to a summator output signal and a correlator signal is subsequently generated in feedback mode. Although in this case the settling time is longer and the canceller remains active so that additional noise might be introduced into the system, it basically improves the cancelling, because minor errors in the canceller, such as gain, phase and offset errors hardly limit the cancellation ratio.

In an advantageous embodiment the canceller incorporates a quadrature detector, two low-pass filters, two amplifiers and a vector modulator.

In a very advantageous embodiment, the two amplifiers incorporated in the canceller are provided with a hold input which, when enabled, maintains the amplifier output voltages at a constant value. This makes it possible for the canceller to settle, in feedforward or feedback mode, and to disconnect the correlator for the duration of a transmission, while the canceller signal remains constant. This for instance allows a burst of short pulses with an extremely fast rise time to be effectively cancelled, assuming that the crosstalk remains constant during the burst.

In another advantageous embodiment, the amplifiers may include a clear input, if cancellation is not required. This prevents the canceller from introducing additional noise into the antenna system.

In another very advantageous embodiment, the canceller is provided with a modulus-determining element connected to both low-pass filters; this element produces a signal that is proportional to the level of crosstalk. This signal may be used for deciding whether certain cancellers have to be connected or that further provisions for the suppression of crosstalk are required. This decision may be made by the operator or by a computer connected to the antenna system.

Yet another advantageous embodiment of the invention is characterized in that per antenna face two cancellers are provided for cancelling crosstalk signals from adjacent antenna faces. This embodiment is based on the assumption that the crosstalk between non-adjacent antenna faces is negligible. For instance in case of a four-face system, it is generally not useful to reduce the crosstalk between two opposed antenna faces.

BRIEF DESCRIPTION OF THE DRAWINGS

The invention will now be described in greater detail with reference to the following figures, of which.

DETAILED DESCRIPTION OF THE INVENTION

Figure 1:
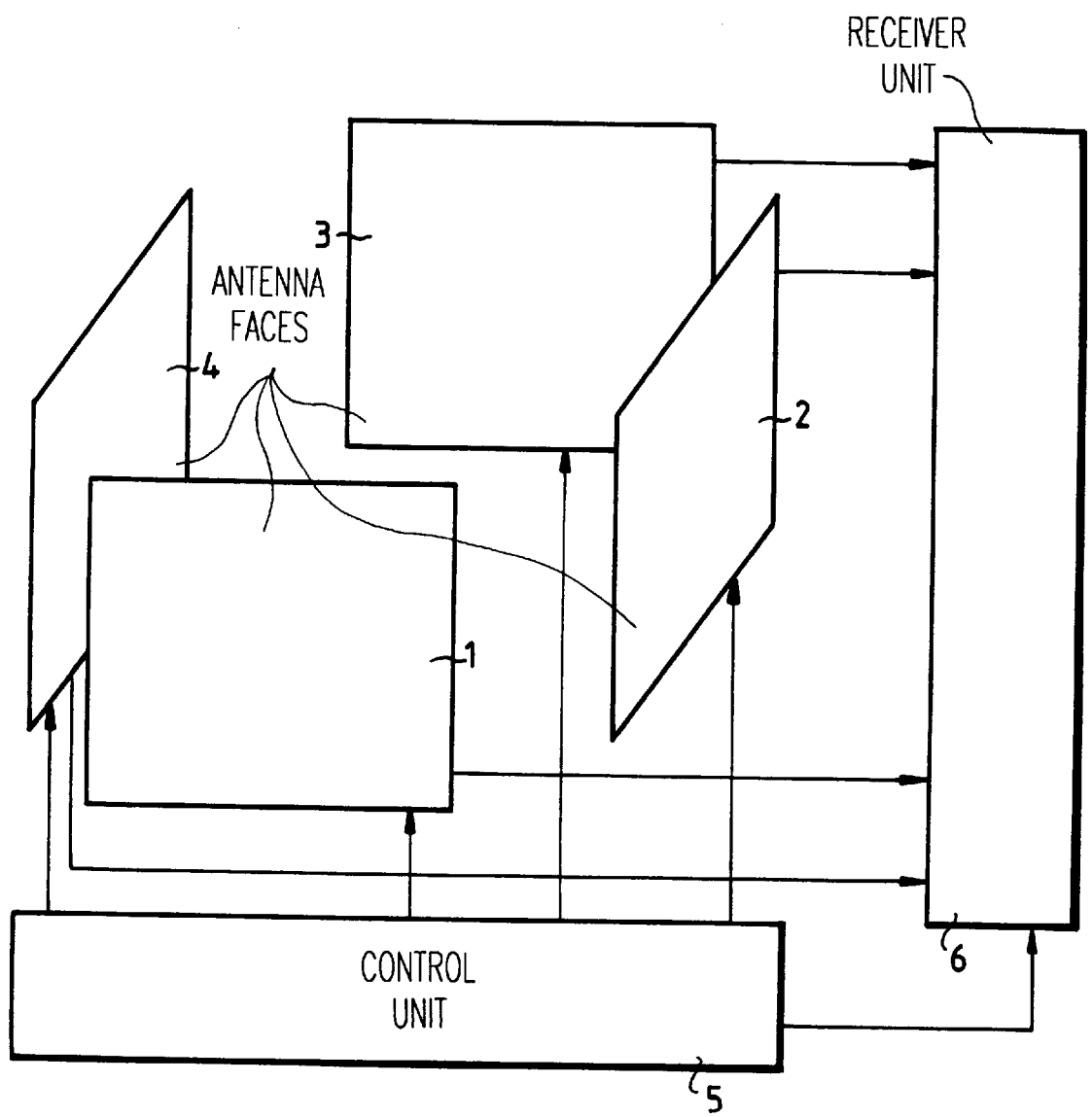
FIG. 1 schematically represents a four-face phased array antenna system.

FIG. 1 is a schematic representation of a phased array radar system comprising four antenna faces 1,2,3,4, which are suitable for shipboard radar applications and jointly provide a 360-degree azimuthal coverage. Antenna faces 1,2,3,4 receive RF input signals and timing signals from a control unit 5 and pass the echo signals received per antenna face to a receiver unit 6 for further processing. Antenna faces 1,2,3,4 may either be active or passive. Active antenna faces are obtained by an array of active T/R modules, each of which is provided with an RF power amplifier for the transmit function, an LNTA for the receive function and an adjustable phase shifter. Passive antenna faces are obtained by an array of passive T/R modules which usually only comprise an adjustable phase shifter. Additionally, both active and passive antenna faces are provided with a summing network for coherently summing the echo signals received, per antenna face, by the individual T/R modules. This causes received echo signals as well as crosstalk signals, possibly produced by antenna faces 2,4 to appear at the output of for instance antenna face 1. Crosstalk signals from antenna face 3 need not be discussed here, since these signals are in actual practice hardly ever relevant.

Because it is known in advance which signals are transmitted by antenna faces 2,4, the strength and phase of these signals at the output of the summing network incorporated in antenna face 1 can be determined with the aid of two correlators. Subsequently, the cancelling of the cross talk signals may proceed.

Besides one summing network per antenna face, one distribution network is provided per antenna face for distributing an RF signal generated by control unit 5 for e.g. antenna face 1 over the T/R modules of antenna face 1.

Figure 2:
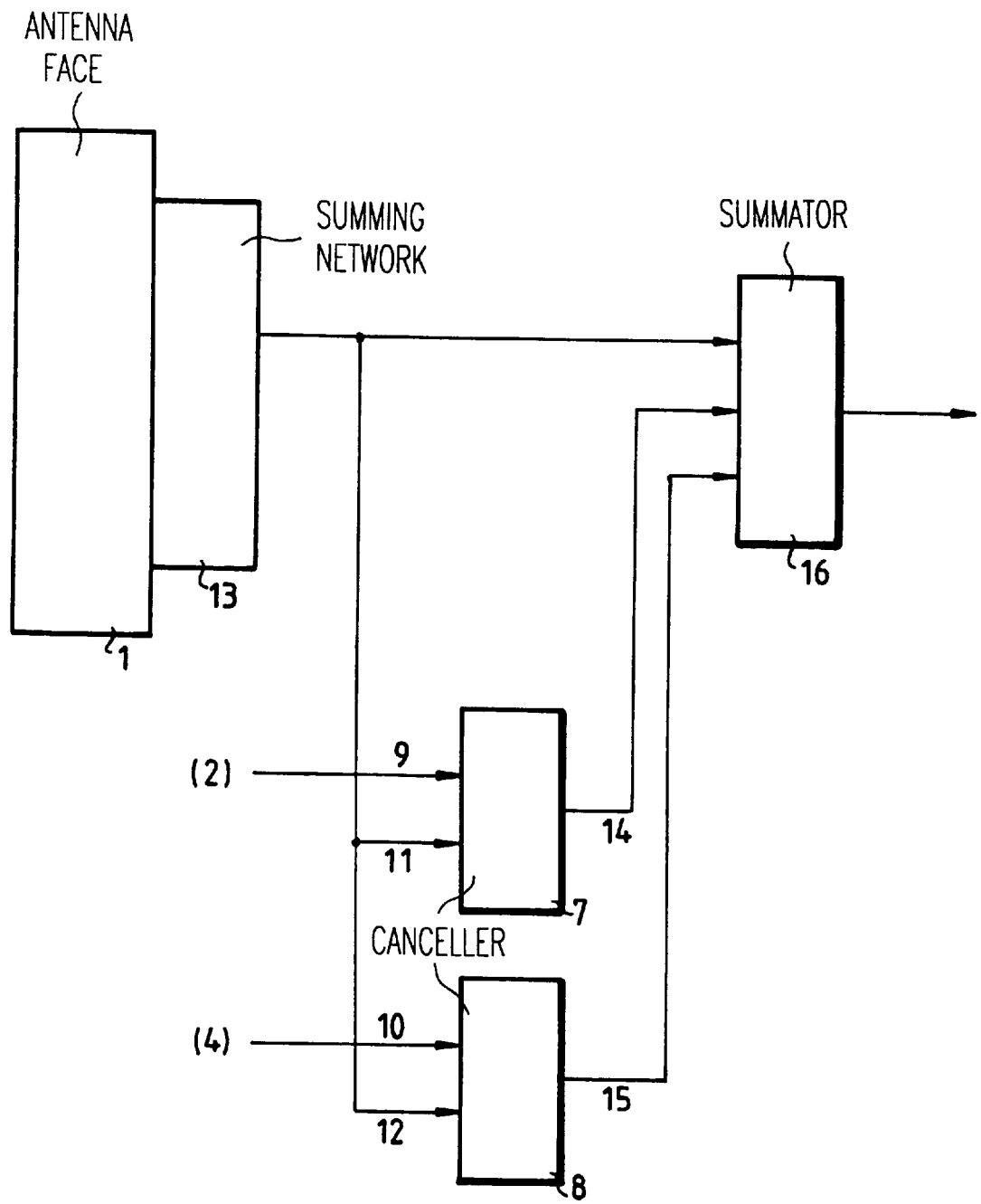
FIG. 2 schematically represents one antenna face comprising two feedforward cancellers.

FIG. 2 schematically represents one antenna face 1 comprising two cancellers 7, 8, used in feedforward mode. From control unit 5, a first input 9 of canceller 7 receives a signal that corresponds to the signal transmitted at the same moment by antenna face 2; a first input 10 of canceller 8 receives a signal that corresponds to the signal transmitted at the same moment by antenna face 4. In addition, the second inputs 11, 12 of cancellers 7, 8 receive the output signal of a summing network 13 which sums radar echo signals received by antenna face 1. Subsequently, output signals 14, 15 of cancellers 7, 8 are in combination with the output signal of summing network 13 applied to a summator 16 in which the actual cancelling process takes place. In this embodiment, canceller 7 generates a near-perfect, noise-free, inverted replica of the crosstalk signal produced by antenna face 2, and canceller 8 a near-perfect, noise-free, inverted replica of the crosstalk signal produced by antenna face 4. The cancellation ratio in this embodiment is limited by the occurrence of minor gain, phase and offset errors in the cancellers.

Figure 3:
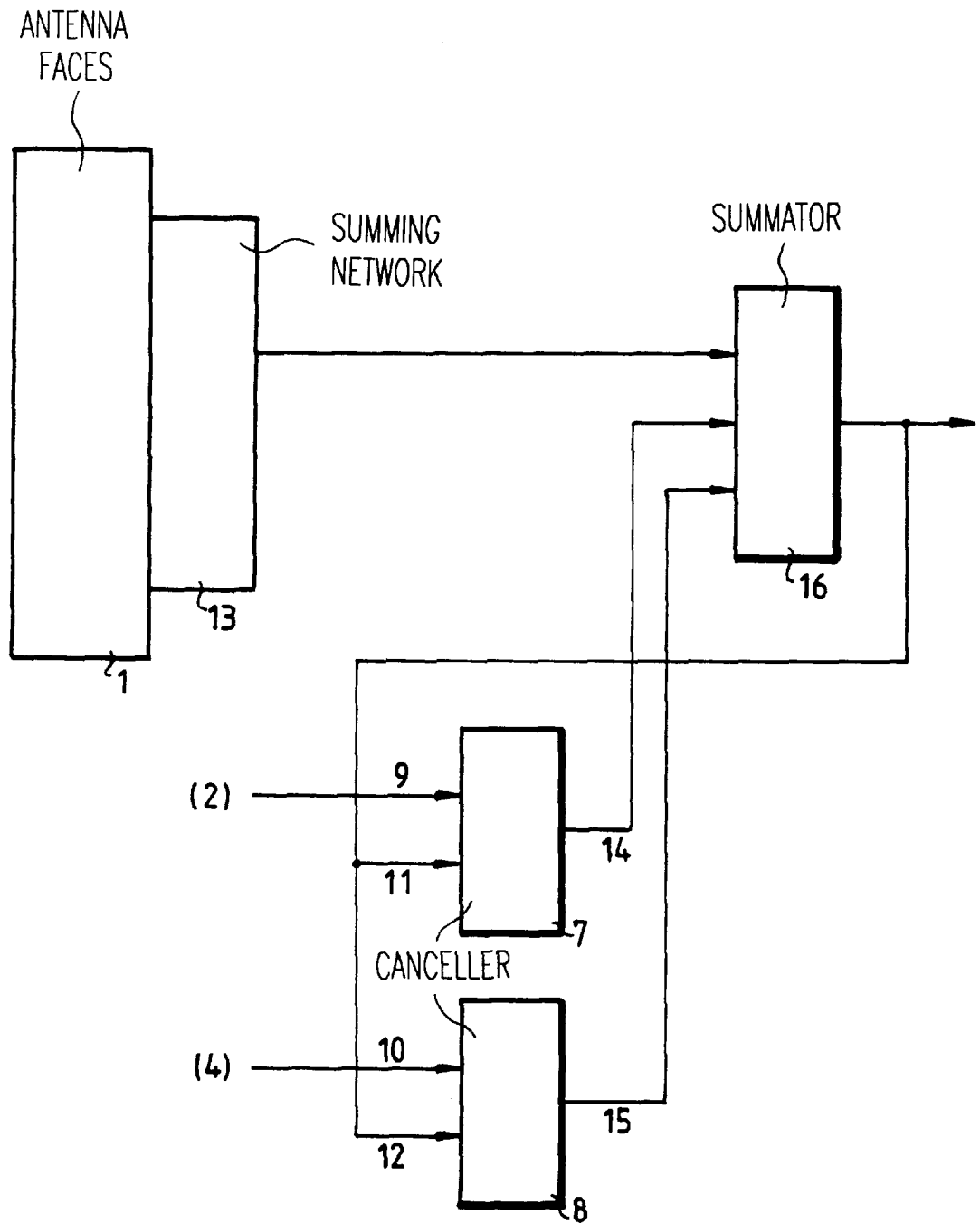
FIG. 3 schematically represents one antenna face comprising two feedback cancellers.

FIG. 3 schematically represents one antenna face 1 comprising two cancellers 7, 8, used in feedback mode. The difference with FIG. 2 is that the second inputs 11, 12 of the cancellers 7, 8 receive the output signal of summator 16. In addition, cancellers 7, 8 each have a built-in amplifier with the aid of which closed loops are realized for minimizing the crosstalk signals produced by antenna faces 2,4. When the closed loops have settled, the cancellers will again generate perfect, noise-free, inverted replica of the crosstalk signals produced by antenna faces 2,4. In this embodiment, the cancellation ratio will usually be an improvement on the cancellation ratio of the embodiment described with reference to FIG. 2, although the closed loop may add some additional noise to the received radar echo signals.

Figure 4:
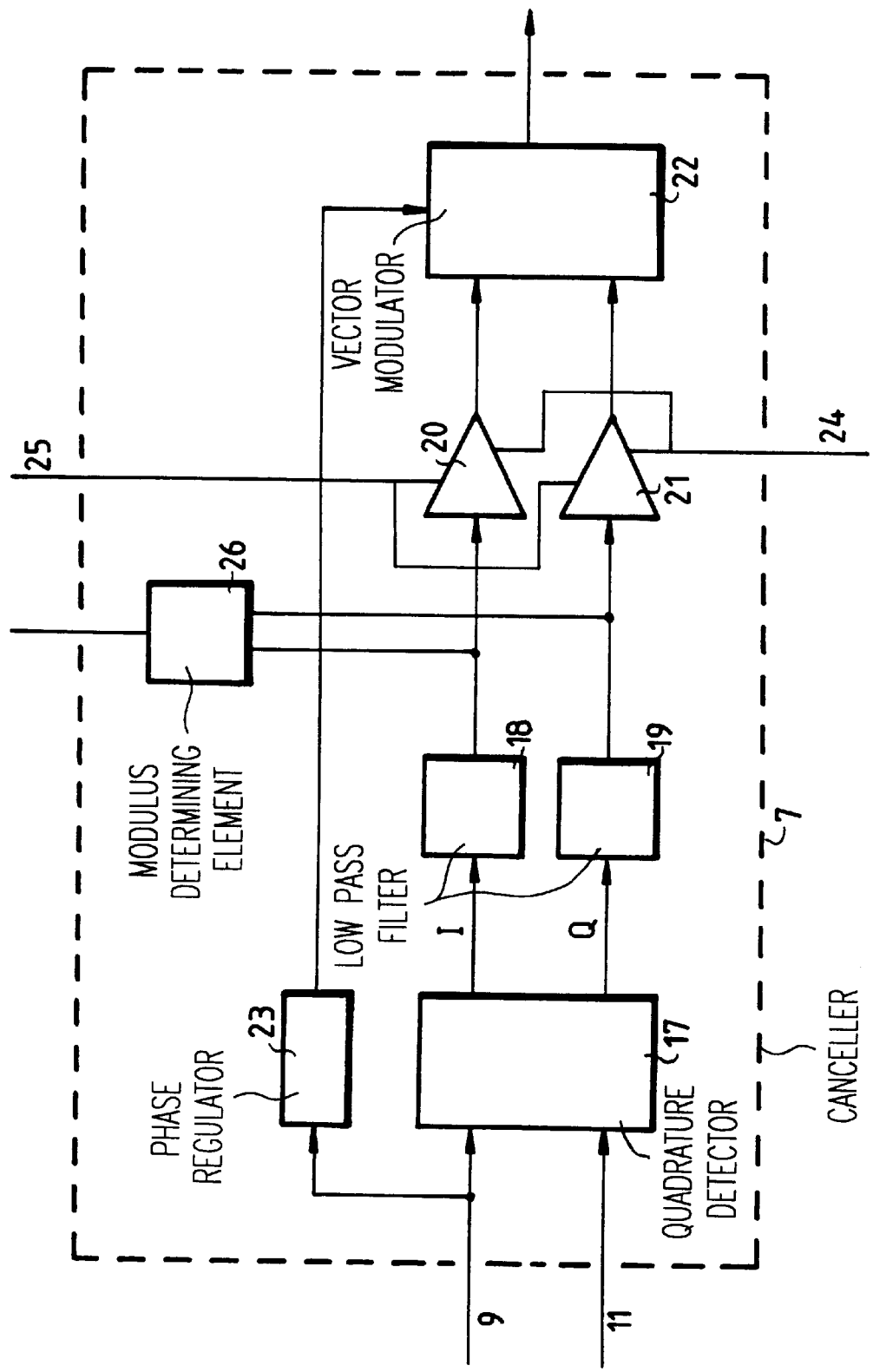
FIG. 4 schematically represents one canceller.

FIG. 4 schematically represents a canceller 7 where input 9 receives a signal that corresponds to the signal transmitted at the same moment by antenna face 2 and input 11 receives a signal that is contaminated with a crosstalk signal produced by antenna face 2. Both signals are applied to a prior art quadrature detector 17, with input 9 connected to the LO input and input 11 connected to the RF input. Quadrature detector 17 delivers an I,Q output signal that is representative of the phase and amplitude of the crosstalk signal. Subsequently, the I,Q output signal is passed through low-pass filters 18, 19, amplified in amplifiers 20, 21 and eventually supplied to a prior art vector modulator 22 in which for instance the signal supplied to input 9 is, directly and shifted in phase through 90 degrees, applied to two voltage-controlled PIN diode attenuators, which attenuators are controlled by the filtered and amplified I,Q signal such that a signal is obtained that is identical to the inverse value of the crosstalk signal. In this context, it is assumed that the gain and polarity of amplifiers 20, 21 have been advantageously chosen and that a phase regulator 23 is available for trimming purposes. Additionally, a hold input 24 may be provided to prevent fluctuations of the output signal of canceller 7. This may be of advantage, if for instance antenna face 2 is engaged in a CW transmission and an MTI scan is scheduled for antenna face 1 in order to detect a moving target. At the beginning of the MTI scan, the hold input is released so that vector modulator 22 can deliver a suitable canceller signal. Next, amplifiers 18, 19 enter the hold mode so that the control of the vector modulator, and consequently the canceller signal, remains constant during the MTI scan. This prevents the canceller from introducing additional noise into the antenna system and ensures the proper functioning of the MTI. An additional advantage is that also very short pulses with a fast rise time are satisfactorily cancelled because filter settling procedures are not required.

To prevent canceller 7 from producing a signal at an inconvenient moment, amplifiers 20, 21 may be provided with a clear input 25 which, when enabled, ensures that the output stages of amplifiers 20, 21 do not produce output signals.

Canceller 7 may further be advantageously provided with a modulus-determining element 26 which, on the basis of the filtered I,Q signal and in a manner known in the art, produces a combined signal that is proportional to the level of crosstalk from face 2 to face 1. This element may be connected to an indicator which issues an alert when the crosstalk has reached a certain level, or to a computer input to be used for the initiation of crosstalk suppression measures.

In the embodiment described with reference to FIG. 2, the overall gain of canceller 7 equals −1. In the embodiment described with reference to FIG. 3, the value of the overall gain has to be higher because the closed loop takes a certain time to settle. The overall gain should in fact be chosen such that the closed loop will settle within a length of time comparable to a response time determined by the low-pass filters 18, 19, which will generally be in the order of 1 microsecond.

The invention is eminently suitable for an antenna system where summing network 13 is of the RF type and where mixing down to an intermediate frequency takes place after summing network 13. The invention can however also be applied for T/R modules of the heterodyne type. In that case, though, the reference signals applied to canceller inputs 9, 10 will have to be mixed down accordingly.

I claim:

1. Phased array radar antenna system, comprising at least two phased array antenna faces, both provided with an array of radiating elements, an array of T/R modules connected to the array of radiating elements, a summing network for the summation of output signals of the array of T/R modules and a control unit for the generation of control signals for the individual antenna faces, characterized in that each antenna face is provided with at least one canceller for at least substantially cancelling crosstalk signals produced by the at least one remaining antenna face, that a first input of the canceller is connected to the summing network that a second input of the canceller is connected to the controlled unit to enable the reception of control signals and that an output signal of the canceller is connected to the summator together with an output signal of the summing network.

2. Phased array antenna system as claimed in claim 1, characterized in that the canceller is provided with a quadrature detector, two low-pass filters, two amplifiers and a vector modulator and that the two amplifiers are provided with a hold input.

3. Phased array antenna system as claimed in claim 1, characterized in that the control signals received by the second input are derived from a signal transmitted by the at least one remaining antenna face.

* * * * *